United States Patent [19]

Hamilton

[11] 4,288,710
[45] Sep. 8, 1981

[54] DRIVE MECHANISM
[75] Inventor: W. Duane Hamilton, Middletown, R.I.
[73] Assignee: American Optical Corporation, Southbridge, Mass.
[21] Appl. No.: 124,193
[22] Filed: Feb. 25, 1980
[51] Int. Cl.³ .......................................... H02K 37/00
[52] U.S. Cl. ................... 310/49 R; 310/80; 310/83
[58] Field of Search ................ 310/80, 83, 75 R, 49
[56] References Cited

U.S. PATENT DOCUMENTS

| | | |
|---|---|---|
| 3,278,774 | 10/1966 | Roller et al. ............... 310/80 X |
| 3,402,308 | 9/1968 | Henschke ..................... 310/80 |
| 3,987,323 | 10/1976 | Hess ............................. 310/80 |
| 4,048,531 | 9/1977 | Buess et al. ............... 310/80 X |
| 4,065,685 | 12/1977 | Newell ..................... 310/83 X |

*Primary Examiner*—Donovan F. Duggan
*Attorney, Agent, or Firm*—Alan H. Spencer

[57] ABSTRACT

Driving an object along a given path with a standard pitch lead screw operated by a stepping motor. Adjustment is provided for accurately completing, with full motor steps, various excursions of object travel ordinarily requiring less than a full motor step for completion of the travel. The above is accomplished by driving the lead screw askew of the axis of desired object travel.

5 Claims, 3 Drawing Figures

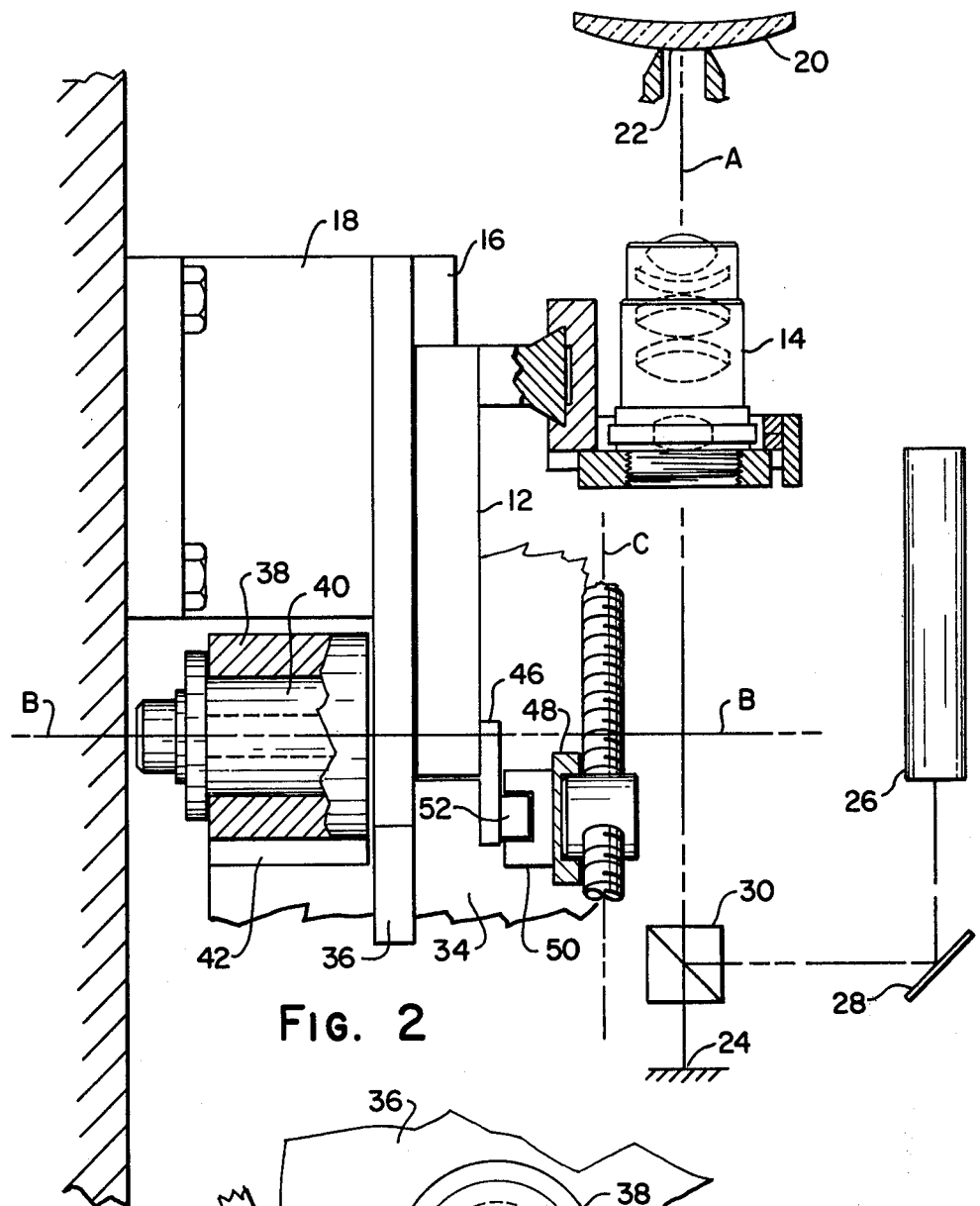
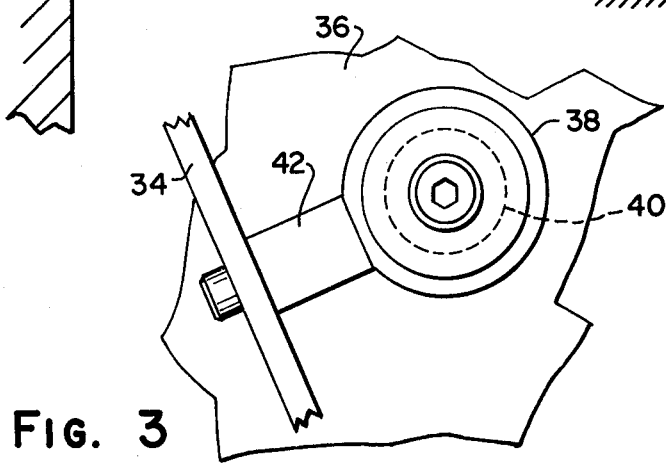
FIG. 2
FIG. 3

DRIVE MECHANISM

BACKGROUND OF THE INVENTION

1. Field of the Invention:

This invention relates to motor operated mechanical drive mechanisms with particular reference to apparatus having utility in precision measuring and/or testing instruments.

2. Discussion of the Prior Art:

Instrument drive mechanisms employing lead screws driven with stepping motors have been seriously restricted in use. When employing standard pitch screws, for example, these mechanisms become limited to applications where total excursions of travel of objects driven thereby were required to correspond precisely to the amount of travel produced by exact multiples of motor pulses. When, on the other hand, it is elected to employ a lead screw of non-standard pitch, the mechanism becomes restricted in use to situations where the total travel required to be produced by the drive mechanism corresponds exactly to the product of the particular screw pitch and number of screw revolutions resulting from selected multiples of full motor pulses.

Accordingly, prior art stepping motor drive mechanisms have very limited application and it is an object of this invention to provide a stepping motor drive mechanism which is uniquely universally adjustable and adaptable to various requirements of object movement and precision positioning or measurements of movement, all or each of which would otherwise require less than a full motor step for completion and ordinarily run short or over desired excursions of travel and/or stopping points.

More particularly, it is an object of invention to provide a mechanism for accomplishing various selected excursions of travel of an object and/or measurements of such travel or precision positioning of the object, each with completion of a full motor step or multiples of full motor steps, i.e. to render a single drive mechanism universally adjustable to various uses.

Still another object is to accomplish the above with incorporation of a standard pitch lead screw.

Other objects and advantages of the invention will become apparent from the following description.

SUMMARY OF THE INVENTION

The foregoing is accomplished with apparatus including a lead screw driven by a stepping motor, the former being arranged for selective angling acutely to the direction of motion desired to be imparted to a lens, mirror or other object requiring precision adjustment and/or particular positioning in measuring or testing equipment. With a slide carrying the object and driven by the angled lead screw, various desired excursions of object travel ending, in each case, with a full step of motor rotation may be established. A standard pitch lead screw (e.g. ¼-20 thread or 0.05 in. pitch) is thereby rendered universally adaptable to various requirements of object travel and/or precision positioning by selective angling of the screw relative to the direction of object travel.

Details of the invention will become more readily apparent from the following description when taken in conjunction with the accompanying drawings.

IN THE DRAWINGS

FIG. 2 is a partially cross-sectioned fragmentary side view of the drive mechanism of FIG. 1; and FIG. 3 is a fragmentary rear view of a portion of the above mechanism taken from the position of line 3—3 in FIG. 2 and looking in the direction of the arrows.

DESCRIPTION OF THE PREFERRED EMBODIMENTS

Figure 1:
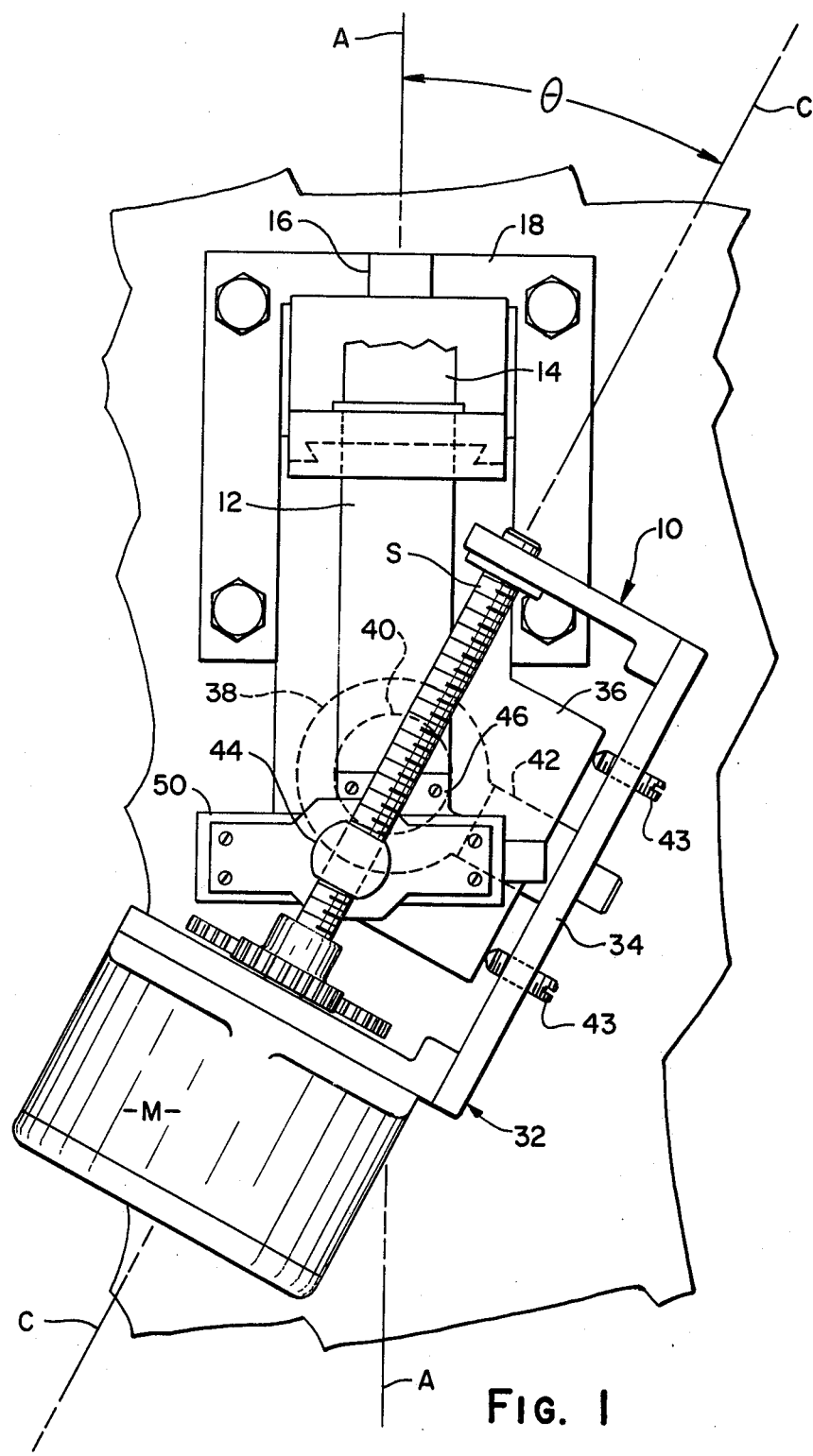
FIG. 1 is an elevational view of a preferred embodiment of the present invention.

In the drawings, there is illustrated drive mechanism 10 arranged to move slide 12 carrying object 14 along slideway 16 of stationary support 18.

Object 14 may comprise a mirror, mechanical pointer, measuring scale, single lens, system of lenses or any one or combination of items requiring precision adjustment and/or highly accurate final positioning relative to reference means, e.g. the stationary support 18 or a target item such as ophthalmic lens 20 (FIG. 2).

For purposes of illustration only, object 14 is shown as comprising an optical objective of the type commonly used in microscopes. The objective in this case is directed toward ophthalmic lens 20 which has convex surface 22 requiring surface power measurement, for example. This measurement may be determined by precise positioning of object 14 (optical objective) along axis A—A at a point where collimated light reaching and reflected from surface 22 becomes focused at point 24 (FIG. 2).

The source for collimated light directed upon surface 22 of target 20 may comprise laser 26, plane mirror 28 and beam splitter 30 which directs a portion of the laser light along axis A—A, through the lens system of object 14 to surface 22. Portions of this light reflected from surface 22 reversely along axis A—A through the lens system of object 14 and beam splitter 30 may be brought to focus at point 24 by adjustment of object 14 (the objective lens system) along axis A—A.

The extent of this adjustment of object 14 (the objective lens system) and final positioning thereof denote focal length of surface 22 and the reciprocal of this focal length, in meters, represents power in diopters.

The foregoing discussion of determining surface power of an ophthalmic lens is merely exemplary of a particular use to which the present invention may be put and is not to be considered as restrictive of the invention. The crux of this invention is to provide novel means for adjusting and/or precisely positioning object 14 at various selected positions along slideway 16. As already mentioned, object 14 may comprise a mirror, pointer, measuring scale or other means serving a different purpose than the illustrated objective lens system.

Referring now to details of the drive mechanism which includes lead screw S carried by U-shaped bracket 32 (FIG. 1), it can be seen that back plate 34 of bracket 32 is pivotally mounted upon plate 36 of stationary support 18. To this end, bearing 38 on pivot post 40 is secured to plate 34 by extension 42 which is best illustrated in FIG. 3. With such means, bracket 32 may be pivoted about axis B—B (FIG. 2) which intersects axis A—A and axis C—C of lead screw S for selectively adjusting the angular relationship $\theta$ between screw S and axis A—A. Slide 12 is adjustable along axis A—A. Set screws 43 are providing for locking mechanism 10 in various desired angular relationships with axis A—A.

Adjustment of slide 12 along axis A—A for movement of objective 14 is accomplished with screw S as follows:

Being driven by stepping motor M, lead screw S is threaded through pivotal nut 44 (FIGS. 1 and 2) which is supported by extension 46 of slide 12. Nut 44 is permitted to freely rotate about its axis in socket 48 (FIG. 2) which is carried by slide 50.

Slide 50 is mounted on slideway 52 which provides freedom for lateral movement of nut 44 as it is advanced or retracted along screw S with operation of motor M.

Slideway 52, slide 50, socket 48 and nut 44 provide a universal connection between screw S and slide 12 wherewith the operation of slide 12 can be effected regardless of the selection of angular settings of mechanism 10 relative to axis A—A.

It should be understood that the setting of mechanism 10 does not exclude disposing screw S parallel to axis A—A.

Operation of the above apparatus involves the following:

Stepping motor M which may embody the commercial product identified as "Sigma Stepping Motor No. 2220" manufactured by Sigma Instruments Inc. of Braintree, Mass. is given a selected number of electrical pulses causing nut 44 to traverse screw S along axis C—C for a distance equal to the number of screw revolutions times the screw pitch.

With the travel of nut 44 along screw S, slide 50 traverses slideway 52 while slide 12 simultaneously traverses slideway 16 along axis A—A by an amount equal to the extent of nut 44 travel times the cosine of angle $\theta$ between axes A—A and C—C.

The angle $\theta$ is adjustable by pivoting bracket 32 about pivot post 40, thereby varying the amount of travel of object 14 on slide 12 per revolution of screw S.

For example, with the objective of moving object 14 exactly 26 mm in 4,644 equal motor steps at 200 steps per revolution of screw S and with screw S having a lead of 0.05 in., angle $\theta$ may determined as follows:

$$\frac{4644 \text{ steps}}{200 \text{ steps/revolution}} = 23.22 \text{ revolutions of screw}$$

$$23.22 \times .05 \text{ pitch} = 1.161 \text{ in. of nut travel}$$

$$1.161 = \cos \theta \times 1.023622 \text{ (26mm)}$$

$$\cos \theta = .8816727$$

$$= 28.15° \text{ angle between axes A—A and C—C}$$

To accomplish the same result as above by prior art method, a 0.044 pitch lead screw having 22.727 leads/inch would be required, i.e.

$$\frac{1.023622 \text{ (26mm) travel of lens}}{23.22 \text{ revolutions for 4644 steps}} = .044 \text{ pitch}$$

A non-standard 0.044 pitch lead screw would be unduly expensive and would serve only the single purpose of satisfying the above exemplary objective, i.e. adjustability to suit other requirements would be lacking.

From the above, it can be seen that this invention provides a stepping motor drive mechanism which is universally adjustable and adaptable to various requirements of object movement and/or precision positioning with completion of full motor steps in each case while using standard lead screw pitch. It is to be understood, however, that there may be modifications and other adaptations of the presently illustrated form of the invention and that the foregoing illustration is not to be interpreted as restrictive of the invention beyond that necessitated by the following claims.

I claim:

1. Apparatus for driving an object along given path with a lead screw operated by a stepping motor wherein the improvement comprises:

a main support for said apparatus having a slideway and slide thereon, the latter carrying said object for movement along said given path;

a bracket supporting said lead screw and motor, said bracket being pivotally connected to said main support for selective angular adjustment of axial direction of said lead screw relative to said given path;

means pivotally interconnecting said slide and lead screw for moving said slide along said slideway with operation of said lead screw; and means for selectively locking said bracket in various positions of said angular adjustment thereof.

2. The apparatus of claim 1 wherein said means for interconnecting said slide and lead screw includes a second slideway and second slide thereon, said second slideway being connected to said first-mentioned slide and extending thereacross; and a nut threaded on said lead screw, said nut being pivotally connected to said second slide.

3. Apparatus according to claim 1 wherein said means for locking said bracket comprises set screws in said bracket, said screws being arranged for selective tightening against said main support.

4. Apparatus according to claim 1 wherein said bracket is of a generally U-shaped configuration with said lead screw extending thereacross and said motor fixed to one end thereof.

5. Apparatus according to claim 4 wherein said bracket is pivotally connected to said main support intermediately of the extension of said lead screw for selectively setting said lead screw askew of said path of said slide which carries said object.

* * * * *